. PLOWS.
[114] Plows.
#9701x
SSIFICATION
701 X
VISION.
Entered
J. PLANK
Imp^d Plough
Patented June 2, 1836
6-2-1836
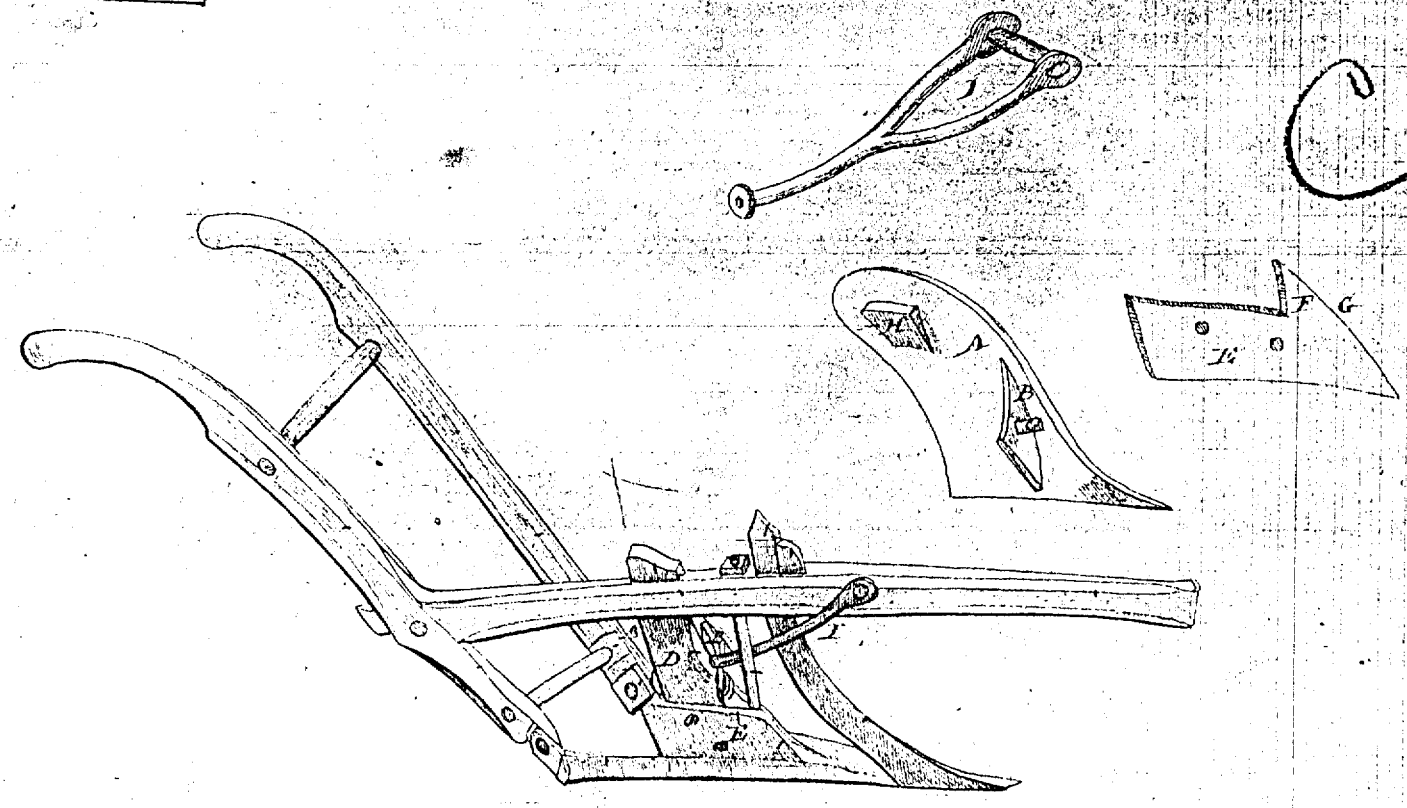
General Services Administration
National Archives and Records Service Washington, DC 20408

Jacob Plank. of Carlisle. Penn^a. 9701X
Letters Patent.

The Schedule referred to in these Letters Patent and making part of the same, containing a description in the words of the said Jacob Plank himself, of his improvement in the Plough.

---

Be it known that I, Jacob Plank, of near Carlisle, in the County of Cumberland, and State of Pennsylvania, have made a new and useful improvement in the Plough: which is described as follows, reference being had to the annexed drawings of the same, making part of this specification —
On a mould board A. about two feet ~~ten~~ inches long, more or less, as may be required, there is a wing B. cast with said mould board, running nearly perpendicular along the inner side of the same, at a distance of 11 1/2 inches from the front point of the mould board on the upper edge of the same, & about 10 inches from the same point on the under edge. This wing is about 3 1/2 inches broad and half an inch thick, & stands out from said mould board inclining to the point of the same, so as to form an acute angle with the front part of the mould board. There is an iron brace C. also cast with the mould board 5/8 of an inch in diameter and 2 1/2 inches long, connected with the wing & the mould board. There are two holes in said wing for screws to fasten the same to the Sheath D. The mould board extends over the side piece on the right hand side of the mould board and connects with the side piece E. by a joint on the inner edge of the mould boards, commencing two inches from the front point of said mould board and extending up along said inner edge six inches and three quarters. The side piece is made of cast iron 16 1/2 inches long on the lower edge, 12 1/2 inches on the upper edge and 5 1/2 inches high. There are two holes near the centre of the side piece to fasten it with screws to the Sheath.
This side piece fits neatly into the joint of the mould board, and has a wing F. cast with it and forming a part of it of a Triangular shape, the base and perpendicular sides of which are each 3 7/8 inches in length & the hypothenuse 6 inches. This wing is on the upper side of the side piece next the joint in the mould board and is inclined over at an angle of about 45 degrees so as to fit in and completely fill up the acute angle formed by the mould board, and the wing on said mould board. On the lower end of said wing on the side piece and formed partly from it, and partly from the mould board is an oval hole G. an inch wide in its greatest diameter for the false coulter to go through. At the back end of the mould board & cast with it at the distance of 2 1/4 inches from its upper extreme point on the inner side of the mould board is a projection H. in the shape of a wedge 6 inches long & three inches broad, running down nearly parallel with the back edge of the said mould board projecting an inch at the Top & tapering from thence till it is even with the mould board. The left handle of the plough rests against this piece of iron. one screw goes through it & two other screws below it, each about three inches from the back of the mould board to fasten the handle of the plough, which are the only screws that go through the mould board. There is an iron brace J. three fourths of an inch in diameter passing through the sheath and fastened there by a screw passing up in a solid piece to the coulter where it divides or branches in form of a clevis and continuing on each side of the beam, more than half way up, where it is fastened by a screw running through the beam.

The dimensions of the parts of the plough may be augmented or diminished as desired. What I claim as my invention and which I desire to secure by letters patent consists in the rising of the mould board and brace. the rising of the side piece and joint in which the side piece fits. and the branched iron brace as before specified and described.

Jacob Plank

Witnesses
Wm. P. Elliot
John Goodyear Jr.

Drawing made

Exd. [illegible]